United States Patent [19]

Anger et al.

[11] Patent Number: 5,499,055
[45] Date of Patent: Mar. 12, 1996

[54] GOB MEASURING APPARATUS

[75] Inventors: Steven J. Anger, Guelph; William J. Devonshire, Orton; Philip W. Annis, Oakville, all of Canada

[73] Assignee: Erin Technologies, Inc., Canada

[21] Appl. No.: 371,883

[22] Filed: Jan. 12, 1995

Related U.S. Application Data

[63] Continuation-in-part of Ser. No. 49,501, Apr. 21, 1993, Pat. No. 5,434,616.

[51] Int. Cl.$^6$ ...................................................... H04N 7/18
[52] U.S. Cl. ............................................. 348/92; 348/135
[58] Field of Search .................. 348/91, 92, 94, 348/135; 65/29.1, 29.11; 364/473; H04N 7/18

[56] References Cited

U.S. PATENT DOCUMENTS

| | | | |
|---|---|---|---|
| 4,090,241 | 5/1978 | Houston | 364/473 |
| 4,165,975 | 8/1979 | Kwiatkowski et al. | 65/29.11 |
| 4,205,973 | 6/1980 | Ryan | 65/29.1 |
| 4,402,721 | 9/1983 | Ericson et al. | 65/29.11 |
| 5,434,616 | 7/1995 | Anger et al. | 348/92 |

Primary Examiner—Tommy P. Chin
Assistant Examiner—Richard Lee
Attorney, Agent, or Firm—Bachman & LaPointe

[57] ABSTRACT

An apparatus for measuring gobs of viscous liquid in free fall from a gob feeder includes a video camera for capturing a complete two dimensional, frozen video image of a plurality of gobs positioned substantially side by side at a point in time during free fall. The frozen image is acquired via a single operation of the camera. A digitizer is provided for digitizing the video image to produce a first digitized image of at least a first gob of the plurality of gobs with n x n pixel arrays for comparison with a second digitized image of a second gob with n x n pixel arrays. An image analyzer is provided for analyzing at least the first digitized image for relatively comparing the first digitized image with the second digitized image for determining any physical differences between the first and second gobs represented by the digitized images.

31 Claims, 3 Drawing Sheets

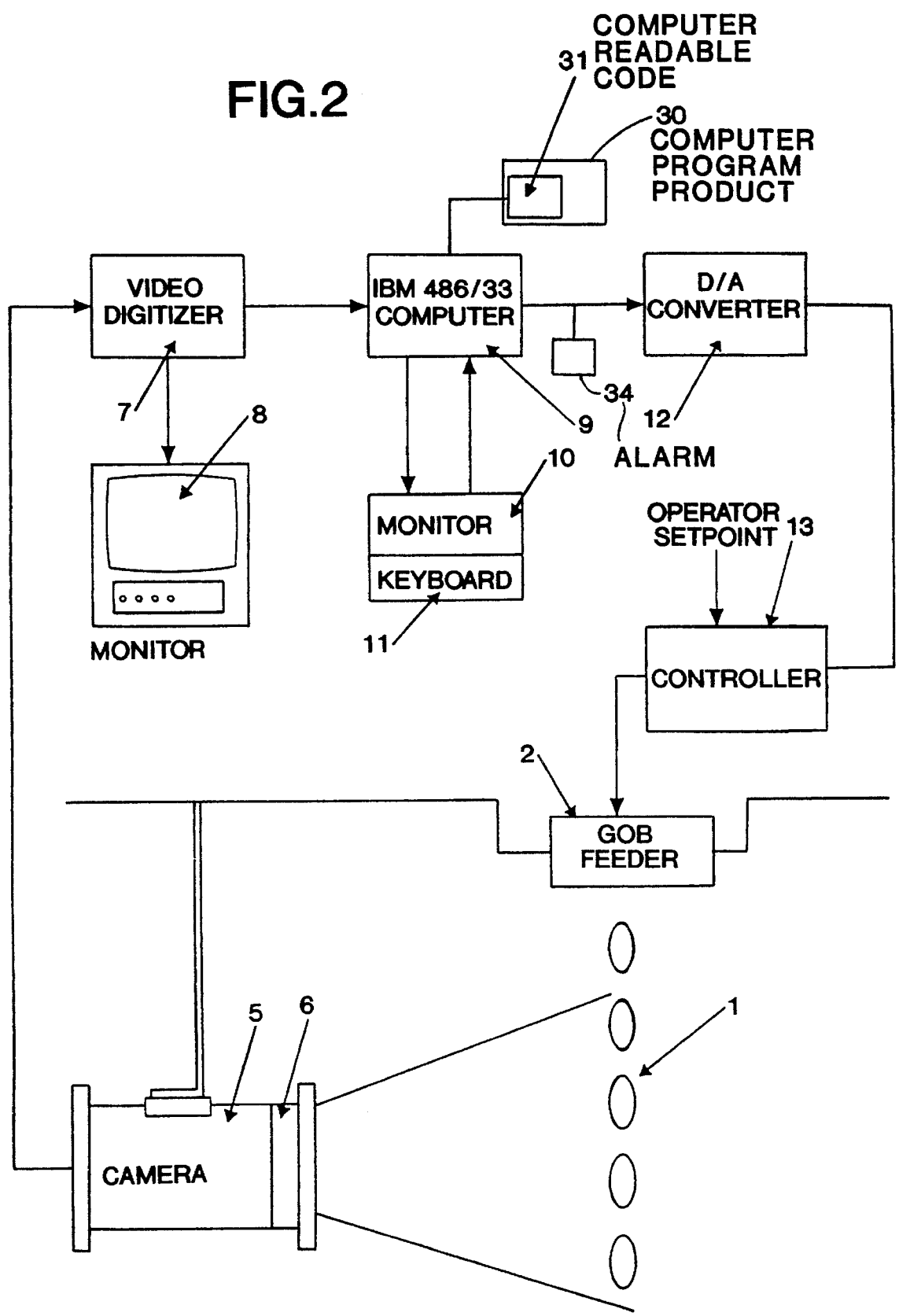

5,499,055

GOB MEASURING APPARATUS

CROSS REFERENCE TO RELATED APPLICATION

This application is a Continuation-In-Part of application Ser. No. 08/049,501 by Steven J. Anger et al., filed Apr. 21, 1993, now U.S. Pat. No. 5,434,616.

BACKGROUND OF THE INVENTION

This invention relates to an apparatus for measuring gobs of viscous liquid in free fall, and more particularly, to an apparatus using comparative and relative positioning measurements to determine if a gob is acceptable, while the gob falls from an orifice of a glass feeder.

In the manufacture of glass articles, molten glass is first supplied to a gob feeder. The feeder comprises a plunger which forces a molten stream of glass through an orifice. The gobs are separated at the orifice with shears prior to falling into the hopper of a glass forming machine. In order to control the manufacture of the glass articles, it is important to provide a means for measuring the weight and shape of the gobs of glass as they fall into the hopper, so as to determine if the gobs are acceptable.

One such method is described in U.S. Pat. No. 4,205,973. In this method the gobs fall through laser beams that activate perpendicularly arranged line cameras. These line cameras take successive scans of the gobs as the gobs fall through their field of view. The successive scans are combined to determine the outline of the falling gob. The system requires careful synchronization of the camera scanning speed with the motion of the gob to ensure that a complete scan is obtained for each passage. A slight variation in the speed of the gobs will cause an error in the measured size since the difference between scanning lines on the image, for a given scanning rate, depends on the velocity of the gob. In addition, variations in angular orientation also adversely affect the accuracy of measurements. Furthermore, a separate camera is required for each gob position.

There exists a need, therefore, in the gob measuring art for a gob measuring apparatus which captures the entire images of gobs during freefall and which is capable of measuring relative positioning with regard to other gobs and comparing the measured gob in terms of size and shape with other gobs and/or gob templates.

SUMMARY OF THE INVENTION

The primary object of this invention is to provide an improved apparatus for measuring gobs of viscous liquids that is not dependent for accuracy on the constancy of the velocity and angular orientation of the gobs.

Another object of this invention is to provide an apparatus for measuring the positioning of a plurality of gobs relative to each other.

Yet another object of this invention is to provide an apparatus for comparing a gob to be measured with a stored gob template to determine the difference in size and/or shape therebetween in measuring units.

Still another object of this invention is to provide an apparatus for providing guidance to a machine operator as to parameters requiring adjustment to acquire suitable gobs.

The foregoing objects are obtained by the Gob Measuring Apparatus of the instant invention which measures gobs of viscous liquid in free fall from a gob feeder. The apparatus includes means for capturing a complete two dimensional, frozen video image of a plurality of gobs positioned substantially side by side at a point in time during free fall. The frozen image is acquired via a single operation of the means for capturing. The apparatus further includes means for digitizing the video image to produce a first digitized image of at least a first gob of the plurality of gobs with n x n pixel arrays for comparison with a second digitized image of a second gob with n x n pixel arrays. In addition, an image analyzing means is provided for analyzing at least the first digitized image for relatively comparing the first digitized image with the second digitized image, for determining any physical differences between the first and second gobs represented by the digitized images.

A process for measuring gobs of viscous liquid in free fall and for obtaining the foregoing objects comprises the steps of capturing a complete two dimensional, frozen video image at a point of time of a plurality of gobs positioned substantially side by side; digitizing the video image and producing a first digitized image of at least a first gob of the plurality of gobs with n x n pixel arrays for comparison with a second digitized image of a second gob with n x n pixel arrays; analyzing at least the first digitized image of the plurality of gobs; and measuring the physical differences between the first and second gobs by relatively comparing the digitized images of the first and second gobs.

The details of the present invention are set out in the following description and drawings wherein like reference characters depict like elements.

BRIEF DESCRIPTION OF THE DRAWINGS

FIG. 2 is a block diagram of the gob measuring apparatus in accordance with the invention.

DETAILED DESCRIPTION OF THE PREFERRED EMBODIMENT

Figure 1:
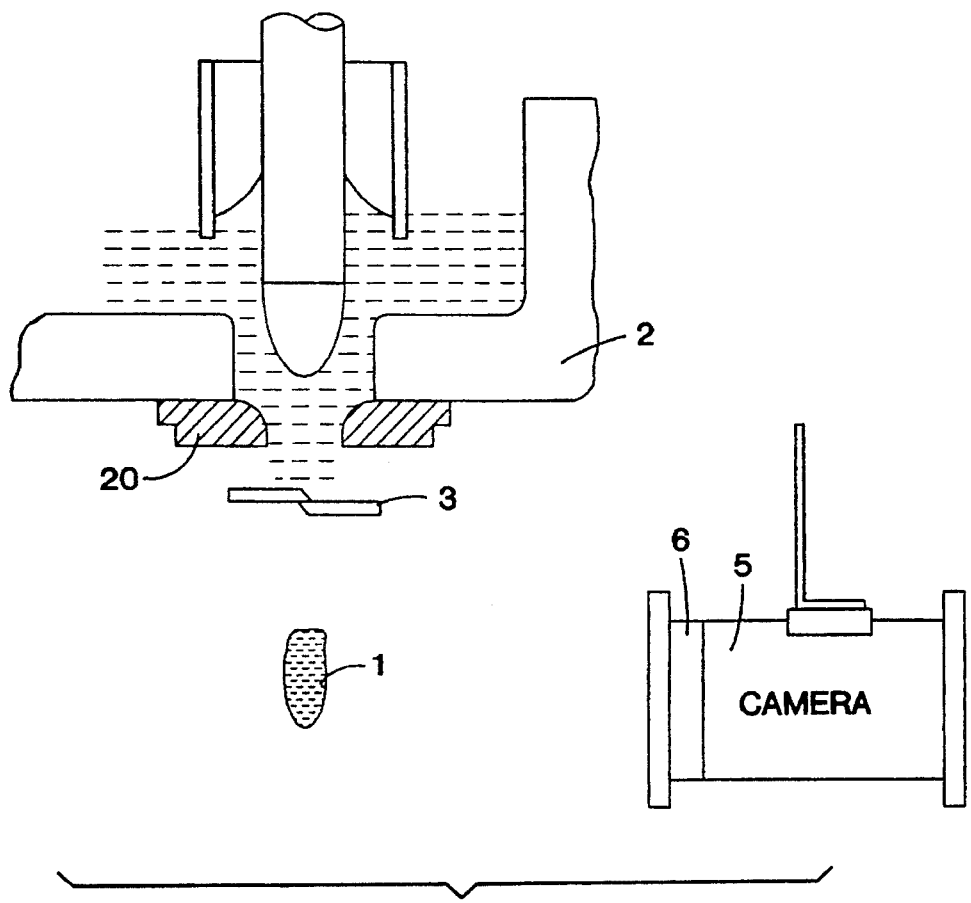
FIG. 1 is an elevational view of a gob feeder showing the camera of the apparatus according to the invention.
Figure 3:
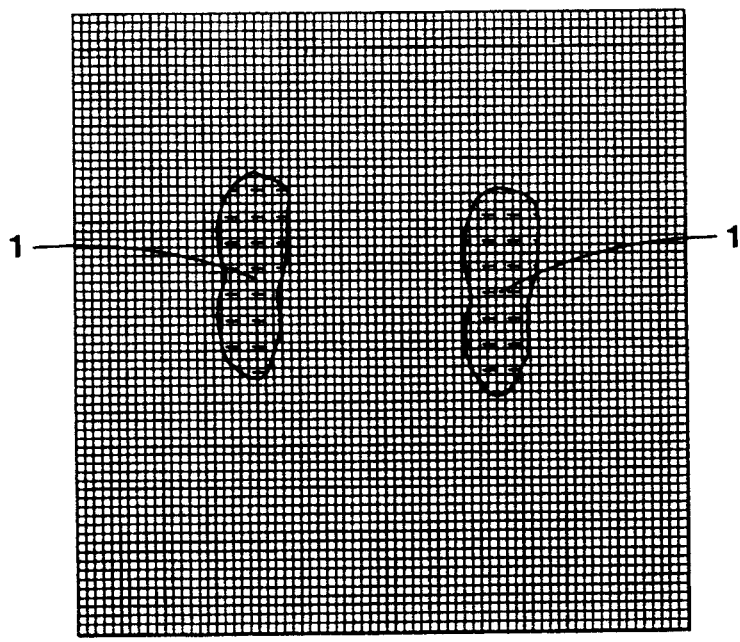
FIG. 3 is a digitized image showing the presence of detected gobs.

Referring now to FIG. 1, gobs 1 fall from the orifice ring 20 of gob feeder 2 after being severed by shears 3. Although one orifice is shown, the gob feeder generally has several orifices arranged side by side. As the gobs fall into a glass forming apparatus (not shown), they pass through the field of view of a video camera 5. Camera 5 takes a succession of frozen video images of gobs 1 in free fall, as shown in FIG. 3.

Referring now to FIG. 2, video camera 5 is a standard charge-coupled-device (CCD) two-dimensional video camera equipped with an electronic shutter 6. Camera 5 has a lens system suitable for focusing on the path of the gobs, and in the preferred embodiment, the lens is a 75 mm manual zoom lens with a two times extender.

Video camera 5, having electronic shutter 6, forms a succession of images of the path of the gob 1. The scanning speed and the speed of the shutter is selected such that each image effectively freezes the motion of the gobs to create a frozen or stationary image. The output of camera 5 is connected to a video digitizer 7. Successive complete images of the same gob are captured by camera 5 and each successive image is digitized. For each successive image, digitizer 7 produces an n by n pixel array, which in the preferred embodiment is 512×512 pixels. Preferably, each successive image for a single gob is analyzed as discussed below, and the analysis is averaged to acquire a more accurate result. While the computer captures a 512×512 interlaced frame, this is separated into two 512×256 fields, which are then analyzed as separate images. Alternatively, a camera with a frame activated shutter could be employed, in which case the image could be analyzed on a frame by frame basis.

This image is displayed on monitor 8. It is also fed to an IBM 33 mHz 486 computer 9 connected to a monitor 10 and keyboard 11 for further processing. Computer 9 carries out the following operations on the digitized image, using a computer program product 30 having computer readable code 31 similar to that disclosed below. The operations are carried out on successive images of a single gob and the results of each are used to acquire average values of the plurality of successive images.

1. The high resolution image is subsampled by preferably extracting every 16th pixel horizontally and vertically to produce a low resolution, 32×32 digitized version of the image that is capable of rapid analysis. Other values may be used regarding the spacing of pixels subsampled, depending upon desired processing speed and accuracy. That is, smaller spacing can be used to attain higher accuracy but lower processing speed.

2. Each pixel of the low resolution image is analyzed to determine whether it falls above or below a pre-determined threshold value, determined by the brightness of the pixel. A brightness of the pixel above a certain value is part of a gob and dark pixels having a brightness below a certain value are background. Accordingly, all values above a predetermined threshold are given a high value and all values below the threshold are given a low value. Thus, a bi-value low resolution image is created.

3. The low resolution, bi-value image is then scanned to locate groups of adjacent pixels in the shape of the number of gobs cut by shears 3. Only those pixel groups within a certain size range are assumed to be valid gobs.

4. If the number of gobs identified in step 3 meets the pre-determined criteria, that is, if the number of gobs identified equal the number of gobs cut for the particular group being analyzed, and none of the gobs touch the edges of the image, that is, none of the gobs touch the edge of the 512×512 image array, computer 9 proceeds to carry out a full analysis on the high resolution image. If any gobs touch the edge, they are likely to be at least partially out of the view of the camera. Only gobs completely within the view of the camera are analyzed. If these criteria are not met, the system returns to step 1.

5. Assuming the criteria are met, the location of the gobs in the lower resolution image are stored, and these locations are used to determine their corresponding locations in the high resolution version of the image. The image is then scanned in the vicinity of the gobs and the location of the edges determined on a line by line basis.

As the glass is hot, the edge of each gob is actually smeared over several pixels. The edge is determined empirically to lie at a certain point where the intensity has a particular gray scale value. By measuring the values of pixels at several adjacent locations, the precise position of the edge can be determined by linear interpolation as a fraction of pixel pitch as follows:

$$x_{interp} = \left[ \frac{threshold - intens_x}{intens_{x+1} - intens_x} \right] + x$$

where,
x=the horizontal position below the threshold; and
x+1=the horizontal position above the threshold.
This equation is used to determine the location of the left edge. A similar equation is used to determine the location of the right edge.

6. At each scanning line, the width of the gob is determined from the distance between the detected edges.

7. Once the edges of the gob have been located, the weights of the gob are calculated from the following formula:

$$Weight = K \cdot G_{dens} \sum_{y=y^1}^{y=y^2} \left( \frac{\pi}{4} \right) (Width(y))^2$$

where,
$G_{dens}$=Density of glass;
K=Calibration constant; and
Width(y)=Width of gob at vertical position y.

The theoretical weight of the gob is actually given by the integral:

$$Weight = K \cdot G_{dens} \int_{y=y^1}^{y=y^2} \left( \frac{\pi}{4} \right) (Width(y))^2 dy$$

A more accurate approximation to the integral can be obtained by using numerical methods, such as, for example, Simpson's rule for numerical integration, if desired.

Since the vertical spacing of the pixels is constant, the mass of the gob is determined by summing the squares of the widths and multiplying by a constant, which can be determined by calibration of the equipment. It is not necessary to measure the width in perpendicular directions because it is a reasonable assumption that the gobs are symmetrical about the longitudinal axis due to the physical forces acting on them as they fall into the hopper. These operations are carried out for each successive image captured of a gob so as to attain average values of the above measured parameters.

Computer 9 outputs the signal representing the weights to digital-to-analog converter 12, which in turn is connected to a controller 13 controlling the gob feeder 2. The controller 13 can be set at a desired set point by the operator.

The shape of the gobs can be displayed on monitor 10, and furthermore, if desired the weight scale intensities of the pixels can be mapped to colors. In this way, a false colored image of the gobs will show the relative temperature of the various parts. Normally the colder areas are mapped to blue and the hotter areas are mapped to red.

Figure 4:
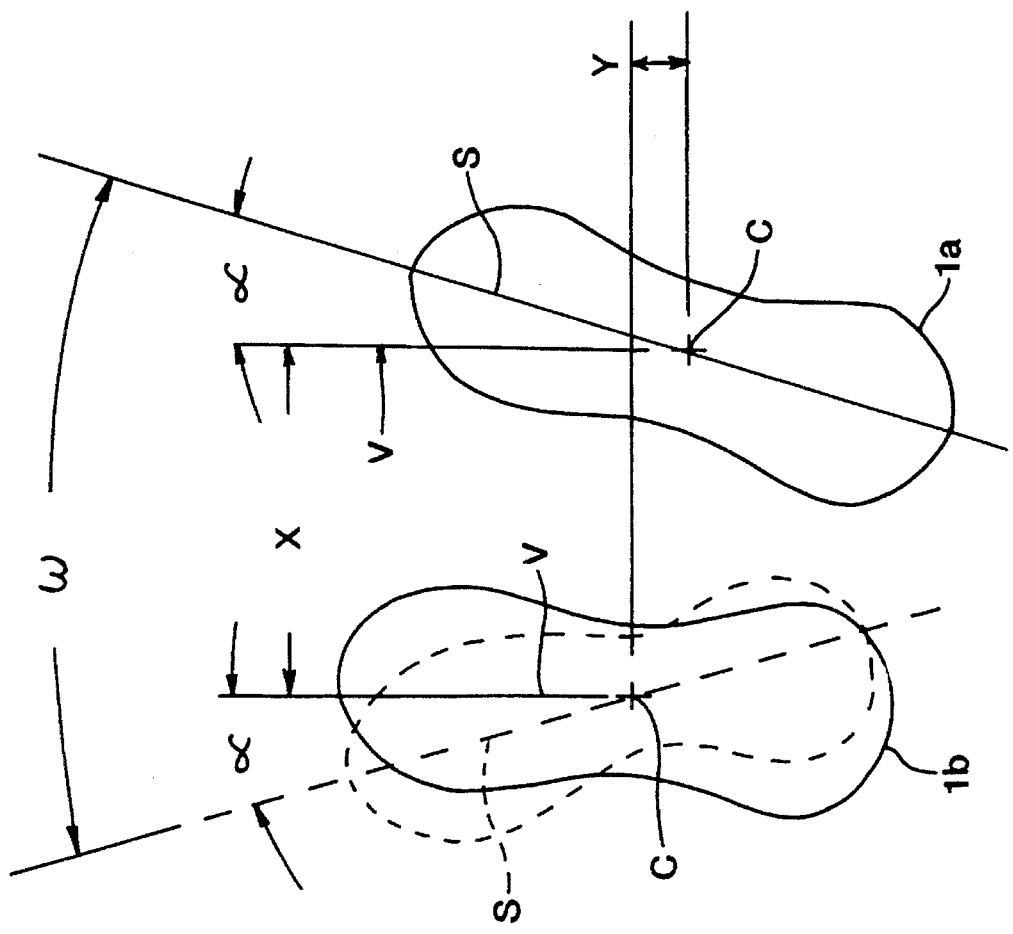
FIG. 4 shows two gobs in free fall and their relative positions.

In addition to measuring the weight of the gob as discussed above, the relative positioning of a plurality of gobs with respect to each other can also be measured. In this embodiment, two gobs 1a and 1b in their relative positions, as those shown in FIGS. 3 and 4, are being measured.

As discussed above, it is preferable that two or more gobs 1 are cut at the same time when exiting a gob feeder. By measuring the relative positioning, if one gob is acceptable and the other is not, the parameters measured can be used to inform a machine operator on how to adjust the gob feeder so that acceptable gobs are produced.

By using image analyzer or computer 9 having computer programmable product 30 therein, as discussed above, to analyze the digitized image, the horizontal and vertical distance of each gob relative to the one to its immediate left or right, can be measured.

Accordingly, to begin the relative positioning measurements, a center point C is calculated by computer 9 via computer program product 30 and computer readable code 31, discussed above, for use as the point of reference for the measurements to follow. The same edge data calculated above for determining gob volume can also be used to calculate the gob center. However, while this may be more efficient, these calculations can be done separately. The center point C can be calculated in a number of ways such as by calculating the center of the area of the gob profile or the center of the outline of the gob. Preferably, the x and y coordinates of center C of the area of the gob profile are calculated via the center coordinates thereof using the following formulas:

$$CenterX = \sum_{y=1}^{M} \sum_{x=1}^{N} (xP_{xy})/NM$$

$$CenterY = \sum_{y=1}^{M} \sum_{x=1}^{N} (yP_{xy})/NM$$

where,

CenterX and CenterY are the x and y coordinates of the gob shape center C;

N=the width of the image;

M=the height of the image; and $P_{xy}$=equals 1 if the pixel at location x,y is turned on, otherwise $P_{xy}$=0.

After calculating the center coordinates of each gob 1a and 1b, additional measurements can now be made to determine the relative positioning between the plurality of gobs 1a and 1b. The horizontal separation between two gobs and the vertical separation between the two gobs can now be calculated using the center point previously determined above, via code 31 of computer program product 30.

With the known center coordinates of each of the digitized images of gobs 1a and 1b in which relative positioning is being determined, the gob angle α relative to a vertical line can be calculated. That is, by providing a line extending vertically, for one or each gob, through the center point C of the digitized image for one or each gob, it is possible to measure the angle of the gob from the vertical, as shown in FIG. 4. Such a line is provided via computer readable code 31 of computer program product 30. A line is then fitted to the outline of the digitized image of gob 1 using a least squares approach via computer readable code 31 of product 30. After the outline of the gob is established, a line S is drawn through the center point C, as previously calculated, which splits the gob into substantially symmetrical halves. Accordingly, knowing the center point C of the digitized image and of the gob, and imposing a vertical line V therethrough, and knowing the outline of the gob in the angular position and imposing the angled line S through the center C in a symmetrical manner, the angle ∝ between the vertical line and the angled line S can be calculated for determining the angle of the gob relative the vertical.

In the situation where the angular relationship is to be determined between the gobs 1a and 1b, and when both gobs are angled relative the vertical, as shown by the dotted lines for gob 1b, the angle ∝ from the vertical V for each gob is measured. The total angular separation ω between the digitized images of the plurality of gobs 1a and 1b can be determined via computer readable code 31 of product 30, as shown in FIG. 4, by adding the values of ∝, for each gob, together. Alternatively, the angle ω can be calculated via code 31 by directly measuring the angle between lines S of the digitized images of gobs 1a and 1b.

By measuring variations in horizontal and vertical distances via the center point between relatively falling gobs and by determining the angle of the gob with respect to a vertical axis and the relative angle with respect to another gob, indications of shearing and loading problems due to the gob feeder 2 can be determined. Accordingly, the operator of the gob feeder or an automated system can make adjustments to the feeder 2 and shears or shearing mechanism 3, based on the measurements of the horizontal separation, the vertical separation, and angular orientation from the vertical and relatively, to correct these problems and cause the gob to fall substantially completely vertically. That is, the angle of the gobs is generally adjusted to give a vertical gob at substantially zero degrees.

Figure 5:
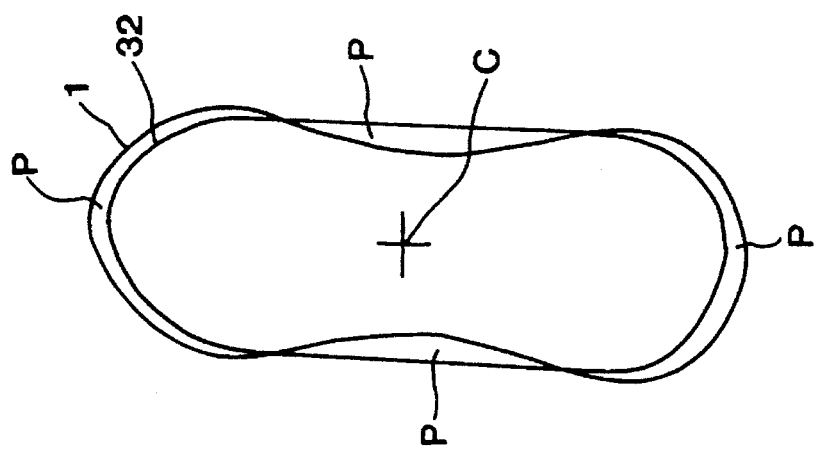
FIG. 5 shows an image of a measured gob compared to a stored gob template.

As another method for determining the acceptability of a gob, while in free fall, the digitized image of the gob can be compared to the image of an acceptable digitized template 32 of a gob, stored in the memory of computer 9, as shown in FIG. 5. Because the gob template is stored in computer 9, the center point thereof is known. Accordingly, after the gob 1 to be measured is captured in a video image via camera 5 and that image is digitized via digitizer 7, the center point C of gob 1 to be measured can be calculated as set forth above. Once the center point C of the gob to be measured is calculated, the center point C of gob 1 is aligned with the center point of the stored gob template. The digitized image of the gob 1 to be measured is also adjusted, if necessary, to be in the same vertical orientation as the gob 1 of the stored template 32.

Accordingly, and referring to FIG. 5, by overlaying the digitized bi-level image of a gob 1 to be measured with the stored acceptable gob template 32 and counting the number of pixels P where the two images differ, it is possible to calculate the size and shape differences between the gob to be measured and the stored shape, preferably in parameters such as measuring units. The difference in size and shape can be expressed as a pixel count or, if the camera has been calibrated, as real units such as $cm^2$. The calculated difference can then be displayed to the operator, wherein such information can be used to help the operator to maintain an acceptable gob shape or to guide the operator to obtain the shape of the stored template 32. Further, the system can include an alarm 34 for notifying the operator if the difference between the gob to be measured and the stored gob exceeds a predetermined value, wherein such value would indicate sudden changes in the shape of the gob 1 and potentially a problem with the system.

By way of example, a sub-sample of suitable computer readable code 31 for measuring three gobs for use with the computer program product in accordance with the embodiment discussed in FIGS. 1–3, is as follows:

```
LOOP:
    capture image 512x512
    vmin <-- 255
    vmax <-- 0
    for x <-- 0 to 31
        for y <--0 to 31
            image [x,y] <-- digitizer [x/16, y/16]
            if (image [x,y] < vmin) vmin <-- image [x,y]
            if (image [x,y] > vmax) vmax <-- image [x,y]
        endfor
    endfor
    if (vmax - vmin < 50)
        goto LOOP
    threshold <-- (vmin + vmax)/2
    for x <-- 0 to 31
        for y <-- 0 to 31
```

```
            if (image [x,y] >= threshold)
                image [x,y] <-- 255
            else
                image [x,y] <-- 0
        endfor
    endfor
    gobcount <-- 0
    for x <-- 0 to 31
        for y <-- 0 to 31
            if ( image [x,y] = 255)
                flood fill position x,y
                floodsize <-- # pixels in flooded region
                minx <-- minimum x value of flood region
                maxx <-- maximum x value of flood region
                miny <-- minimum y value of flood region
                maxy <-- maximum y value of flood region
                if ( floodsize < 150 or maxx >= 30)
                    goto LOOP
                if ( minx <= 1 or maxx >= 30)
                    goto LOOP
                if ( miny <= 1 or maxy >= 30
                    goto LOOP
                window_minx [gobcount] = 16 * minx
                window_maxx [gobcount] = 16 * maxx
                window_miny [gobcount] = 16 * miny
                window_maxy [gobcount] = 16 * maxy
                gobcount <-- gobcount + 1
            endif
        endfor
    endfor
    if (gobcount != 3) goto LOOP
    for gob <-- 0 to 2
        minx <-- window-minx (gob]
        maxx <-- window-maxx (gob)
        miny <-- window-miny [gob]
        maxy <-- window-maxy [gob]
        image <-- digitizer image from minx,miny to
maxx,maxy
        volume <-- 0
        for y <-- 0 to (maxy - miny + 1)
        vmin <-- 255
        vmax <-- 0
        for x <-- 0 to (maxx - minx + 1)
            if (image [x,y] < vmin) vmin <-- image [x,y]
            if (image [x,y] > vmax) vmax <-- image [x,y]
        endfor
        threshold ,-- (vmin + vmax)/2
        left <-- 0
        while (image [left,y] < threshold)
        left <-- left + 1
        right <-- vmaxx - vminx + 1
        while (image [right,y] < threshold)
        right <-- right - 1
        left <-- (threshold - image[left-1,y])/
(image[left,y] - image[left-1,y]) + left - 1
        right <-- (threshold - image[right,y])/
(image[right+1,y] - image[right,y]) + right
            volume <-- volume + (PI/4 * (right - left)^2
            weight [pos] <-- calibration_const * volume
        endfor
        output average of weight [0], weight[1], weight[2] to D/A
endfor
```

The primary advantage of this invention is that an apparatus is provided for measuring gobs of viscous liquids that is not dependent on the constancy of the velocity of the gobs for accuracy. Another advantage of this invention is that an apparatus is provided for measuring the positioning of a plurality of gobs relative to each other. Yet another advantage of this invention is that an apparatus is provided for comparing a gob to be measured with a stored gob template to determine the difference in size and/or shape therebetween in measuring units.

It is apparent that there has been provided in accordance with this invention a gob measuring apparatus which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An apparatus for measuring gobs of viscous liquid in free fall from a gob feeder, comprising:

means for capturing a complete two dimensional, frozen video image of a plurality of gobs at a point in time during free fall, wherein said frozen image is acquired via a single operation of said means for capturing;

means for digitizing said video image to produce a first digitized image of at least a first gob of said plurality of gobs with n x n pixel arrays for comparison with a second digitized image of a second gob with n x n pixel arrays; and an image analyzing means for analyzing at least said first digitized image for relatively comparing said first digitized image with said second digitized image for determining any physical differences between said first and second gobs represented by said digitized images.

2. The apparatus according to claim 1, wherein said second gob is a gob comprising said plurality of gobs and said means for digitizing produces said second digitized image of said second gob, said first and second digitized images comprising said captured video image of said plurality of gobs, relatively positioned during freefall.

3. The apparatus according to claim 2, wherein said image analyzing means comprises a computer having computer program product means for analyzing said first and second digitized images.

4. The apparatus according to claim 3, wherein said computer program product means includes computer readable code means for determining parameters representing the relative positioning between said first and second gobs via said digitized images of said first and second gobs.

5. The apparatus according to claim 4, wherein said computer program product means includes computer readable code means for determining a center point of each of said digitized images of said first and second gobs.

6. The apparatus according to claim 5, wherein said computer program product means further includes computer readable code means for determining horizontal distance between center points of said digitized images of said first and second gobs.

7. The apparatus according to claim 5, wherein said computer program product means includes computer readable code means for determining vertical distance between center points of said digitized images of said first and second gobs.

8. The apparatus according to claim 5, wherein said computer program product means includes computer readable code means for determining angular orientation of at least one of said digitized images of said first and second gobs relative a vertical through said center point of said at least one of said digitized images of said first and second gobs.

9. The apparatus according to claim 5, wherein said computer program product means includes computer readable code means for determining the relative angular orientation between said digitized images of said first and second gobs.

10. The apparatus according to claim 1, further comprising a monitor for displaying the said at least first and second digitized images of said plurality of gobs.

11. The apparatus according to claim 1, wherein said means for capturing is a video camera having an electronic shutter means for capturing said frozen video image in a single operation of said electronic shutter means at a single point in time.

12. The apparatus according to claim 1, further comprising means for shearing said gobs from said gob feeder.

13. The apparatus according to claim 1, further comprising means for indicating when the physical differences between said first and second gobs surpass an acceptable threshold value.

14. The apparatus according to claim 13, wherein the means for indicating is an alarm.

15. The apparatus according to claim 1, wherein said second digitized image is a digitized image of an acceptable gob template wherein said digitized image of said gob template is stored in a memory.

16. The apparatus according to claim 15, wherein said image analyzing means comprises a computer having computer program product means for analyzing at least said first digitized image.

17. The apparatus according to claim 16, wherein said computer program product means includes computer readable code means for comparing said first digitized image with said second digitized image of said acceptable gob template for determining physical differences between said first gob and said gob template.

18. The apparatus according to claim 17, wherein said computer program product means includes computer readable code means for determining a center point of said first digitized image of said first gob.

19. The apparatus according to claim 18, wherein said computer program product means includes computer readable code means for aligning a center point of said first digitized image of said first gob with a center point of said digitized image of said gob template.

20. The apparatus according to claim 19, wherein said computer program product means includes computer readable code means for measuring the differences in size and shape between said first gob and said gob template via a relative comparison between said first digitized image and said digitized image of said gob template.

21. A process for measuring gobs of viscous liquid in free fall, comprising the steps of:
    capturing a complete two dimensional, frozen video image at a point of time of a plurality of gobs;
    digitizing said video image and producing a first digitized image of at least a first gob of said plurality of gobs with n x n pixel arrays for comparison with a second digitized image of a second gob with n x n pixel arrays;
    analyzing at least said first digitized image of said plurality of gobs; and
    measuring physical differences between said first and second gobs by relatively comparing said digitized images of said first and second gobs.

22. The process according to claim 21, wherein said second gob is a gob comprising said plurality of gobs and the step of digitizing further comprises producing said second digitized image, said first and second digitized image comprising said captured video image of said plurality of gobs positioned relatively.

23. The process according to claim 22, wherein said step of measuring further includes the step of determining parameters indicating relative positioning between said first and second gobs of said plurality of gobs using said first and second digitized images as captured side by side.

24. The process according to claim 21, wherein the step of measuring further comprises the step of determining a center point for each of said first and second digitized images.

25. The process according to claim 24, wherein the step of measuring further comprises the step of determining horizontal distance between said center points of said first and second digitized images.

26. The process according to claim 24, wherein the step of measuring further comprises the step of determining vertical distance between said center points of said first and second digitized images.

27. The process according to claim 24, wherein the step of measuring further comprises the step of determining angular orientation of at least one of said first and second gobs relative a vertical through said center point thereof using said digitized image of said at least one of said first and second gobs.

28. The process according to claim 24, wherein the step of measuring further comprises determining relative angular position between said first and second gobs using said digitized images thereof.

29. The process according to claim 21, wherein said second digitized image is a digitized image of a gob template, further comprising the steps of:
    storing the digitized image of the gob template having a known center point; and
    the step of measuring further comprising the step of determining a center point for said first digitized image.

30. The process according to claim 29, further comprising the steps of:
    comparing said first digitized image of said first gob with said digitized image of said gob template stored in memory by aligning said center of said first digitized image with said center of said gob template; and
    said step of measuring further comprising measuring differences in size between the first digitized image and said digitized image of said gob template in measuring units.

31. The process according to claim 30, further comprising the step of signaling an alarm if said differences in size surpass threshold values.

\* \* \* \* \*